United States Patent [19]

Lee

[11] 4,156,669

[45] May 29, 1979

[54] LATEXES OF ENCAPSULATED VINYLIDENE CHLORIDE COPOLYMER PARTICLES

[75] Inventor: Do I. Lee, Midland, Mich.

[73] Assignee: The Dow Chemical Company, Midland, Mich.

[21] Appl. No.: 899,209

[22] Filed: Apr. 24, 1978

[51] Int. Cl.$^2$ .................... C08L 9/08; C08L 9/10; C08L 13/02; C08L 15/02
[52] U.S. Cl. .............. 260/29.7 R; 260/29.6 RB; 260/29.6 RW; 260/29.7 DP; 260/879; 260/890; 428/307; 260/880 R; 260/29.7 H; 260/29.7 T
[58] Field of Search ............. 260/29.6 RB, 29.6 RW, 260/29.7 R, 29.7 DP, 29.7 H, 29.7 T; 428/307

[56] References Cited

U.S. PATENT DOCUMENTS

| | | | |
|---|---|---|---|
| 3,254,044 | 5/1966 | Gunderman | 260/29.6 |
| 3,282,867 | 11/1966 | Stahy et al. | 260/17 |
| 3,291,768 | 12/1966 | Pfuger et al. | 260/29.6 |
| 3,309,330 | 3/1967 | Settlage | 260/29.6 |
| 3,379,665 | 4/1968 | Lyon et al. | 260/29.6 |
| 3,562,235 | 2/1971 | Ryan | 260/29.6 RB |
| 3,714,103 | 1/1973 | Huhn et al. | 260/29.6 RB |
| 3,745,136 | 7/1973 | Huhn et al. | 260/29.6 RB |
| 4,002,801 | 1/1977 | Knechtges | 260/29.6 RW |

FOREIGN PATENT DOCUMENTS

| | | | |
|---|---|---|---|
| 501656 | 4/1954 | Canada | 260/27.7 UP |
| 963296 | 7/1964 | United Kingdom. | |

*Primary Examiner*—Herbert J. Lilling
*Attorney, Agent, or Firm*—James B. Guffey

[57] ABSTRACT

Improved aqueous vinylidene chloride copolymer latexes are provided in which the dispersed polymer particles are heterogeneous and comprise from about 35 to about 75 weight percent of polymerized vinylidene chloride. The heterogeneous polymer particles of such latexes contain a major amount of a soft copolymer core comprising vinylidene chloride and an aliphatic conjugated diene. Such particles also contain a minor amount of a polymeric shell which encompasses the core portion and which consists essentially of (a) a monomer selected from the group consisting of aliphatic conjugated dienes, monovinylidene aromatic monomers and saturated aliphatic esters of monoethylenically unsaturated carboxylic acids; (b) optionally, up to about 30 weight percent (based upon the shell) of vinylidene chloride; and (c) optionally, up to about 10 weight percent based upon such shell of a monoethylenically unsaturated carboxylic acid.

10 Claims, No Drawings

LATEXES OF ENCAPSULATED VINYLIDENE CHLORIDE COPOLYMER PARTICLES

BACKGROUND OF THE INVENTION

This invention relates to stable aqueous latexes of interpolymers containing vinylidene chloride and aliphatic conjugated dienes and to the use of such latexes as binders or adhesives in various applications such as in paper coating compositions, in carpet backsizing, in nonwoven fabrics, etc.

Aqueous colloidal dispersions of polymer particles, which are commonly referred to in the art as latexes are generally known to be useful, both alone and in various formulations, in a multitude of applications such as coatings, adhesives, impregnants, etc. In addition, a wide variety of such dispersions of differing homopolymeric and copolymeric composition (such as vinylidene chloride copolymers, styrene-butadiene copolymers, homopolymers and copolymers of acrylate and methacrylate esters, etc.) are known to have certain specific chemical and/or mechanical properties which render them especially desirable for particular end use applications. For example, aqueous polymer latexes comprising substantial or predominant amounts of vinylidene chloride copolymerized with generally relatively smaller amounts of other monomers are known to possess a community of desirable properties making them well adapted for wide variety of end uses. Among such properties are reduced flammability, low permeability to oxygen and water vapor, chemical inertness including resistance to greases and oils, good binding power for pigments, fillers, etc., high impact and tensile strength, and the like. See, for example, U.S. Pat. Nos. 3,254,044; 3,282,867; 3,291,768; 3,309,330; 3,310,514; 3,379,665; 3,472,808 and 4,002,801.

Unfortunately, however, the foregoing advantageous properties of the known vinylidene chloride latexes are accompanied, to greater or lesser degrees, by certain disadvantageous properties including limited flexibility and elongation, colloidal instability (e.g., sensitivity to, or coagulation upon, storage and/or exposure to mechanical shear), chemical instability (e.g., degradation and/or discoloration by exposure to polyvalent metal ions), water sensitivity, and, especially, heat and light instability (e.g., degradation and/or discoloration upon exposure to heat and/or light).

In view of the indicated disadvantages of prior art vinylidene chloride copolymer latexes, it is highly desirable to provide improved latexes of vinylidene chloride-containing polymers which overcome most or all of such disadvantages, particularly those related to chemical instability and to heat and light instability.

SUMMARY OF THE INVENTION

Novel aqueous latexes have now been discovered which have the aforementioned desirable combination of properties. Such latexes are composed of an aqueous medium having dispersed therein heterogeneous polymer particles which comprise an average of from about 35 to about 75 weight percent of polymerized vinylidene chloride. Such polymer particles are heterogeneous in the sense that they comprise, on the average and based upon 100 parts by weight of the polymer particle, from about 50 to about 95 parts by weight of a core portion of one polymer composition and from about 5 to about 50 parts by weight of a shell portion of another polymer composition. The polymer composition of the aforementioned core portion comprises, in polymerized form and based upon the weight of such core, (a) from about 40 to about 80 weight percent of vinylidene chloride, (b) from about 20 to about 60 weight percent of an open-chain aliphatic conjugated diene, and (c) from 0 to about 10 weight percent of a monoethylenically unsaturated carboxylic acid. The polymeric shell portion which encompasses the aforementioned core consists essentially of, in polymerized form and based upon the weight of such shell, (a) from about 60 to about 100 weight percent of a monomer selected from the group consisting of aliphatic conjugated dienes, monovinylidene aromatic monomers, and saturated aliphatic esters of monoethylenically unsaturated carboxylic acids; (b) from 0 to about 30 weight percent of vinylidene chloride; and (c) from 0 to about 10 weight percent of a monoethylenically unsaturated carboxylic acid.

The foregoing vinylidene chloride copolymer latexes of the invention are useful in a variety of practical applications, for example, as carpet back-sizings, as paper coating binders, as binders for asbestos, as adhesives for binding together various types of substrates, as free films, as film-forming components for protective and/or decorative coatings (e.g., paints, etc.) and the like. Such latexes are particularly beneficial in many of such applications by virtue of exhibiting substantially improved heat and light stability relative to that of prior art latexes of corresponding vinylidene chloride content. Naturally the latexes of the invention also possess the known beneficial properties which are characteristic of vinylidene chloride homopolymers and copolymers such as, for example, limited propensity to ignite and/or to propagate combustion upon exposure to a small scale ignition source, grease and oil resistance, low water vapor and oxygen permeability, and the like.

DETAILED DESCRIPTION OF THE INVENTION

The polymer particles of the latexes of the invention are broadly characterized as having on the average from 50 to about 95, preferably from about 50 to about 90, parts by weight per 100 parts total by weight of the total particle composed of a core portion which is a soft copolymer containing vinylidene chloride and an aliphatic conjugated diene.

As used herein, the term "soft" means that the copolymer to which such term refers has a glass transition temperature equal to or less than room temperature. That is, the composition of such copolymer is such that a latex of homogeneous polymer particles having the same composition would form continuous adherent films at room temperature (i.e., from about 20° to about 25° C.).

The precise monomeric composition of the aforementioned soft vinylidene chloride and aliphatic conjugated diene containing copolymer core portion is not particularly critical so long as the total vinylidene chloride content of the dispersed polymer particles (i.e., including both the core portion and the shell portion) is between about 35 and about 75 weight percent based upon total particle weight. Generally, such criterion are suitably satisfied when the copolymer core portion comprises, based upon the weight of such core, from about 40 to about 80, preferably from about 40 to about 70 and most preferably from about 50 to about 70, weight percent of vinylidene chloride and from about 20 to about 60, preferably from about 30 to about 60 and most preferably from about 30 to about 50, weight percent of an aliphatic conjugated diene.

The choice of the aliphatic conjugated diene for copolymerization with the vinylidene chloride (and with any optionally employed monomers) to form the soft copolymer core portion is not particularly critical. However, most aliphatic conjugated dienes having significant commercial availability typically contain from 4 to about 9 carbon atoms and, accordingly, that type of diene is generally employed. Examples of such aliphatic conjugated dienes typically include: 1,3-butadiene, 2-methyl-1,3-butadiene, 2,3-dimethyl-1,3-butadiene, pentadiene, 2-neopentyl-1,3-butadiene, and other hydrocarbon analogs of 1,3-butadiene, and, in addition, the substituted 1,3-butadienes, such as 2-chloro-1,3-butadiene, 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide copolymers having particularly desirable properties and are therefore preferred. The cost, ready availability and the excellent properties of copolymers produced therefrom make 1,3-butadiene the most preferred aliphatic conjugated diene.

Optionally, the copolymer core portion can also contain a small amount (e.g., from 0 to about 10 weight percent based upon the weight of the core) of a monoethylenically unsaturated carboxylic acid. The presence of some of such unsaturated carboxylic acid (e.g., from about 1 to about 10 weight percent of the core weight) in the core portion is preferred, for example, to impart the desired degree of reactor stability during polymerization of such core portion. Most preferably, from about 2 to about 5 weight percent (based upon the core) of such unsaturated carboxylic acid is employed in the core portion for such purpose.

The monoethylenically unsaturated carboxylic acid which is optionally, but preferably, employed in the copolymer core can vary so long as such acid is copolymerizable with the other monomers employed. Examples of such acid include itaconic acid, acrylic acid, methacrylic acid, fumaric acid, maleic acid, vinyl benzoic acid and isopropenyl benzoic acid. Preferred monoethylenically unsaturated carboxylic acids include acrylic acid, methacrylic acid, itaconic acid, fumaric acid and maleic acid. Naturally, comonomeric mixtures of such monoethylenically unsaturated acids can also be employed if desired, and in addition, such acids can be introduced to the polymerization as such or they can be formed in situ in an aqueous polymerization medium by introducing a hydrolyzable derivative of such acid (e.g., salts or the anhydride of the desired acid) into such aqueous medium.

In addition to the aforementioned monomers (i.e., the vinylidene chloride, the aliphatic conjugated diene and the monoethylenically unsaturated carboxylic acid), there can optionally also be employed in the core copolymer a relatively small amount (e.g., from 0 to about 20, preferably about 0 to about 15, most preferably from about 0 to about 10, weight percent of the core portion) of other copolymerizable monoethylenically unsaturated monomers. Such optional monomers include, for example, saturated aliphatic esters of monoethylenically unsaturated carboxylic acids such as those esters employed in the hereinafter described shell portion; monovinylidene aromatic monomers such as those employed in the hereinafter described shell portion; vinyl esters such as vinyl acetate, vinyl propionate, vinyl butyrate, vinyl stearate, vinyl 2-ethylhexoate, etc.; vinyl ethers such as vinyl n-butyl ether, vinyl 2-chloroethyl ether, vinyl ethyl ether, vinyl 2-ethylhexyl ether, vinyl isobutyl ether, vinyl methyl ether, etc.; and the like.

The heterogeneous polymer particles of the latexes of the invention are also characterized by having a polymeric shell portion which encompasses (e.g., surrounds or encapsulates) the hereinbefore described soft vinylidene chloride copolymer core portion. Such shell portion constitutes a minor portion of the total weight of the heterogeneous polymer particle (e.g., an average of about 5 to about 50, preferably from about 10 to about 50, parts by weight per 100 parts of particle weight) and is composed of a homopolymer or a copolymer consisting essentially of from about 60 to about 100 weight percent of a monomer selected from the group consisting of the hereinbefore described aliphatic conjugated dienes, monovinylidene aromatic monomers and saturated aliphatic esters of monoethylenically unsaturated carboxylic acids, from 0 to about 30 weight percent of vinylidene chloride, and from 0 to about 10 weight percent of a monoethylenically unsaturated carboxylic acid as hereinbefore described.

Monovinylidene aromatic monomers suitable for use in the polymer of the shell portion (and/or as an optional component of the core copolymer) include those monomers wherein a radical of the formula

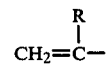

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta-, and para-methylstyrene, ortho-, meta-, and para-ethylstyrene, o,p-dimethylstyrene, o,p-diethylstyrene, isopropylstyrene, o-methyl-p-isopropylstyrene, p-chlorostyrene, p-bromostyrene, o,p-dichlorostyrene, o,p-dibromostyrene, vinylnaphthalene, diverse vinyl (alkylnaphthalenes) and vinyl (halonaphthalenes), and comonomeric mixtures thereof. Because of considerations such as cost, availability, ease of use, etc., styrene and vinyltoluene are preferred and styrene is especially preferred as the monovinylidene aromatic monomer.

Saturated aliphatic esters of monoethylenically unsaturated carboxylic acids which are suitable for use in the polymer of the shell portion (as well as being an optional component of the core copolymer) include esters of a monoethylenically unsaturated carboxylic acid (e.g., such as those acids described hereinbefore) and a saturated aliphatic alcohol having from 1 to about 18 carbon atoms (e.g., alcohols such as methanol, ethanol, ethylene glycol, 1-propanol, 2-propanol, 1,3-propanediol, 1-butanol, 2-butanol, 2-methyl-2-propanol, 1-pentanol, 2-pentanol, 3-pentanol, 1-hexanol, 2-ethyl-1-hexanol, and the like). Examples of such esters include hydroxyalkyl acrylates or methacrylates such as 2-hydroxyethyl acrylate, 2-hydroxyethyl methacrylate, 3-hydroxypropyl acrylate, 3-hydroxypropyl methacrylate, etc.; $C_1$–$C_{18}$ alkyl esters of acrylic acid and of methacrylic acid such as methyl acrylate, methyl methacrylate, ethyl acrylate, ethyl methacrylate, propyl acrylate, propyl methacrylate, n-butyl methacrylate, 2-ethylhexyl methacrylate, etc.; and the like.

The precise monomeric composition of the polymeric shell portion can vary within the foregoing broad limits and across the spectrum of suitable monomers described above. Thus, for example, such shell portion can be composed of a homopolymer of a single aliphatic conjugated diene, a single monovinylidene aromatic monomer, or a single saturated aliphatic ester of a monoethylenically unsaturated carboxylic acid. Examples of such homopolymers include poly(1,3-butadiene)polystyrene, poly(vinyl toluene), poly(butyl acrylate), poly(methyl methacrylate), poly(ethyl acrylate), etc. Alternatively, such shell portion can be composed of a copolymer of a monomer of one of the foregoing types (e.g., an aliphatic conjugated diene) with one or more monomers of the same type and/or with one or more monomers of other of the foregoing types (e.g., one or more monovinylidene aromatic monomers and/or one or more saturated aliphatic esters of a monoethylenically unsaturated carboxylic acid) and/or with up to about 10 weight percent of one or more monoethylenically unsaturated carboxylic acids and/or with up to about 30 weight percent of vinylidene chloride.

Preferably, at least some (e.g., from about 1 to about 10, especially from about 2 to about 5 weight percent of the shell) monoethylenically unsatrated carboxylic acid is employed in the shell polymer in order to impart reactor stability to the shell polymerization and in order to enhance the adhesiveness of the resulting polymer latex. In addition, it is preferable that the shell portion contain at least about 20 (especially at least about 30) weight percent of a polymerized monovinylidene aromatic monomer or a polymerized saturated aliphatic ester of a monoethylenically unsaturated carboxylic acid (especially a monovinylidene aromatic monomer). It is also preferred that the shell portion contain at least about 20 (especially at least about 30) weight percent of an aliphatic conjugated diene. Naturally, shell compositions which embody all of the foregoing preferred features are particularly beneficial in the practice of this invention. Accordingly, shell compositions of particular interest include those consisting essentially of (a) from about 20 to about 79 (especially from about 30 to about 68) weight percent of a monovinylidene aromatic monomer, a saturated aliphatic ester of a monoethylenically unsaturated carboxylic acid or a combination thereof (especially a monovinylidene aromatic monomer); (b) from about 20 to about 79 (especially from about 30 to about 68) weight percent of an aliphatic conjugated diene; (c) from about 1 to about 10 (especially from about 2 to about 5) weight percent of a monoethylenically unsaturated acid; and (d) from 0 to about 30 weight percent of vinylidene chloride.

The manner in which the aqueous latexes of the invention are prepared is not particularly critical, so long as the hereinbefore described compositional limitations are satisfied. Thus, for example, such latexes can be prepared by encapsulating the dispersed polymer particles of a pre-existing vinylidene chloride copolymer latex with the polymeric shell portion. This can be conveniently accomplished by emulsion polymerizing the desired shell portion monomers in the presence of an existing latex which has the desired core composition. In fact, such method is of particular benefit in that it represents a means by which the properties (especially the heat and light stability) of existing conventional vinylidene chloride copolymer latexes can be substantially improved. Except for being conducted in the presence of the indicated finished latex, the polymerization of the shell portion is pursuant to conventional polymerization techniques.

The latexes of the invention can also be prepared from scratch via a staged emulsion polymerization. In such staged polymerization, an intermediate aqueous latex (comprising dispersed particles which become the aforementioned soft vinylidene chloride copolymer core) is formed in a first emulsion polymerization stage. Thereafter, the encapsulating shell portion is formed on the soft vinylidene copolymer particles in a second polymerization stage conducted in the presence of the aforementioned intermediate vinylidene chloride copolymer latex. In this preparation method, the first stage polymerization can be operated as essentially an independent polymerization to provide an essentially finished vinylidene chloride copolymer latex. That is, the first polymerization stage can include conventional finishing steps prior to performing the second stage polymerization (e.g., removal of residual unpolymerized first stage monomer such as by steam stripping, etc.; filtering to remove coagulum; and the like).

Alternatively, the staged polymerization can be conducted without the aforementioned intermediate finishing steps. Thus, for example, the second stage polymerization can be started immediately following the first stage polymerization without removal of any first stage residual monomer which may be present. Moreover, such second stage can be started well in advance of complete polymerization of the first stage monomers (i.e., at any desired degree of polymerization thereof) so long as the resulting shell composition does not, on the average, constitute more than about 50 weight percent of the total weight of the resulting polymer particles and so long as such shell composition does not contain more than about 30 weight percent of polymerized vinylidene chloride.

From the foregoing, it will be apparent to the skilled artisan that the precise method of preparation chosen in a given instance will depend upon a variety of factors such as the desired core to shell ratio, the desired overall vinylidene chloride content, the desired level of vinylidene chloride content, if any, in the shell polymer, and the like. In particular, it will be apparent that the amount of residual unpolymerized vinylidene chloride monomer that can suitably be present in the vinylidene chloride copolymer latex (i.e., the core portion latex) when the shell portion monomers are added thereto will depend upon (a) the amount of shell portion monomers to be employed and (b) upon the vinylidene chloride content desired for the resulting shell portion polymer. Thus, for example, if it is desired that the polymeric shell contain substantially no polymerized vinylidene chloride content, then it is necessary to ensure that there is substantially no residual unpolymerized vinylidene chloride monomer remaining in the first stage vinylidene chloride copolymer latex. This can be accomplished by polymerizing the first stage monomer charge to essentially 100 percent conversion of such monomer charge to polymer. Alternatively, the degree of conversion of monomer to polymer in the first stage can be incomplete (i.e., less than about 100 percent conversion) and the residual unpolymerized first stage monomers can be removed prior to the second stage polymerization by conventional techniques such as steam stripping, etc.

In those instances where some polymerized vinylidene chloride is desired in the polymeric shell portion, an additional portion of vinylidene chloride monomer (i.e., in addition to any residual vinylidene chloride monomer contained by the first stage polymer latex) can be added as a component of the second stage monomer charge in order to obtain the desired polymerized vinylidene chloride content in the polymeric shell portion. Preferably, however, no additional vinylidene chloride monomer is added to the polymerization with the second stage monomer charge and, instead, any polymerized vinylidene chloride in the polymeric shell portion is that which results from residual unpolymerized vinylidene chloride monomer remaining in the first stage polymer latex when the second stage polymerization is started. Accordingly, in this latter instance the content of polymerized vinylidene chloride content in the polymeric shell portion is most conveniently controlled by controlling the point (i.e., degree of conversion of first stage monomer to polymer) at which the second stage polymerization is begun. In such fashion, the shell portion vinylidene chloride content is essentially controlled by controlling the quantity of residual unpolymerized first stage monomer entering the second stage polymerization relative to the quantity of the second stage monomers which is externally added thereto.

The aforementioned residual unpolymerized first stage monomers are characteristically composed predominantly of vinylidene chloride monomer since such monomer typically polymerizes more slowly than the other first stage monomers. Accordingly, the requirement that the polymeric shell contain a maximum of about 30 weight percent of polymerized vinylidene chloride places certain constraints upon the foregoing polymerization processes. Thus, for example, when only a small polymeric shell portion is desired (e.g., in the range of about 5 to about 10 parts per 100 parts of total particle weight), it is necessary either that the first stage polymerization be carried to a relatively high degree of conversion (e.g., about 98 to 100 percent first stage monomer conversion for 5 parts polymeric shell and about 96 to 100 percent first stage monomer conversion for 10 parts polymeric shell) or that at least some of the residual first stage vinylidene chloride monomer be removed prior to the second stage polymerization.

Naturally, when relatively larger polymeric shell portions are desired, larger quantities of second stage monomers are added and, accordingly, larger quantities of residual first stage vinylidene chloride monomer can suitably be permitted to enter into the second stage polymerization. Thus, for example, at polymeric shell contents of 15 parts, 20 parts and 25 parts (per 100 parts of total particle weight), first stage monomer to polymer conversion in the ranges of from about 94 to 100, from about 93 to 100 and from about 91 to 100, respectively, are suitably employed. Similarly, suitable first stage conversion ranges for shell portions (per 100 parts of total particle weight) of 30, 40 and 50 parts by weight are, respectively, from about 88 to 100, from about 83 to 100 and from about 77 to 100.

In all of the foregoing modes of preparing the latexes of the invention, the individual polymerization stages are conducted pursuant to conventional emulsion polymerization techniques. Thus, for example, the monomers to be employed for the particular stage involved are typically dispersed, with agitation sufficient to emulsify the mixture, in an aqueous medium which may contain known emulsifying agents (i.e., surfactants) as well as other ingredients conventionally employed in the art as polymerization aids (e.g., conventional chain transfer agents, etc.). Such monomers are then subjected to polymerization with the aid of a conventional source for generating free radicals such as conventional free radical polymerization catalysts, activating radiation etc.

Free radical polymerization catalysts suitable for use in the foregoing polymerization stages include those already known to promote emulsion polymerization. Among such catalysts are oxidizing agents such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and catalysts which, like redox catalysts, are activated in the water phase, for example, by a water-soluble reducing agent.

Such catalysts are employed in an amount sufficient to cause polymerization (i.e., in a catalytic amount). As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents which can be employed include the anionic, cationic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali metal alkyl sulfates, the sulfonated alkyl esters, the fatty acid soaps and the like. Specific examples of these well known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts so long as adequate emulsification is achieved to provide dispersed polymer particles having the desired particle size and particle size distribution. However, as a general rule, an amount ranging from about 0.01 to about 5 weight percent, based upon the total monomer to be polymerized, is advantageously employed. It should be noted, however, that it is preferable that no (or only small amounts of) emulsifying agents are added in the aforementioned second stage polymerization. This feature is desirable in order that the majority of the second stage polymer is formed on or around existing first stage polymer particles rather than initiating substantial amounts of homogeneous second stage polymer particles.

Optionally, conventional seeding procedures can be employed in the first stage polymerization to aid in control of such polymerization and in achieving the desired average particle size and particle size distribution for the dispersed first stage copolymer particles. When used, the seed particles are typically employed in amounts corresponding to from about 0.1 to about 1 weight percent of the core comonomers. Generally such seed particles range in size from about 10 to about 20 percent of the diameter of the soft vinylidene chloride copolymer particles to be formed. The monomeric composition of the seed latex can vary so long as it does not coagulate during formation of the vinylidene chloride copolymer particles. However, it is often desirable that the speed employed be of a monomeric composition substantially the same as that of the vinylidene chloride copolymer to be formed.

As has been noted, conventional chain transfer agents can also be employed in the practice of the present invention and, indeed, in polymerization stages employing an aliphatic conjugated diene, it is preferable to do so. Examples of such conventional chain transfer agents include bromoform, carbon tetrachloride, long chain mercaptans (e.g., lauryl mercaptan, dodecyl mercaptan, etc.), or other known chain transfer agents. Conventional amounts (e.g., from about 0.1 to about 30 weight percent based on the total monomer charge) of such chain transfer agents are typically employed in such preferred embodiments.

Other ingredients (e.g., acids, salts, chain transfer agents, chelating agents, etc.) known in the art to be useful for various specific purposes in emulsion polymerization can also be employed in the aforementioned polymerization stages. For example, when the polymerizable constituents for a given polymerization stage include a monoethylenically unsaturated carboxylic acid comonomer, polymerization under acidic conditions (e.g., the aqueous media having a pH value of from about 2 to about 7, especially from about 2 to about 5) is preferred. In such instances the aqueous medium can include acids and/or salts to provide the desired pH value and possibly a buffered system. On the other hand, when a monoethylenically unsaturated carboxylic acid monomer is not employed, the pH of the aqueous medium can conveniently range from about 2 to about 10.

The manner of combining the ingredients selected for a given polymerization stage can vary. For example, various known monomer feed methods can be employed (such as continuous monomer addition, incremental monomer addition or addition of the entire amount of the monomers in a single charge). Similarly, the entire amount of the aqueous medium (or specific ingredients thereof) can be present in the polymerization vessel before introduction of the monomer or the comonomer mixture. Alternatively, the aqueous medium (or a portion thereof) can be added (continuously or incrementally) during the course of the polymerization.

The polymerization of a given polymerization stage is generally initiated by heating the emulsified mixture (with continued agitation) to a temperature usually between about 40° C. and about 100° C., preferably between about 70° C. and about 90° C. Polymerization is continued by maintaining the emulsified mixture at the selected temperature until the desired conversion of comonomers to copolymer has been reached.

Suitable particle sizes for the latex resulting from a given polymerization stage are generally obtained directly from such polymerization stage. Thus, for example, the first stage polymerization is generally suitable to provide average particle diameters (for the soft vinylidene chloride copolymer particles formed therein) in the range of from about 0.08 to about 0.3 (preferably from about 0.12 to about 0.25) micrometer. Similarly, the second stage polymerization is generally suitable to provide the dispersed heterogeneous polymer particles resulting therefrom with an average diameter in the range of from about 0.1 to about 0.3 (preferably from about 0.15 to about 0.25) micrometer.

Following polymerization, the solids content of the resulting aqueous heterogeneous polymer latex can be adjusted to the level desired by adding water thereto or by distilling water therefrom. Generally, such desired level of polymeric solids content is from about 20 to about 65, preferably from about 45 to about 60, weight percent on a total weight basis.

In addition, it is sometimes desirable to have small amounts of certain known additives incorporated in the latex. Typical examples of such additives are surfactants, bacteriocides (e.g., formaldehyde), neutralizers, antifoamers, etc. Such additives can be incorporated into the latexes of the invention in a conventional manner and at any convenient point in the preparation of such latexes.

The aqueous latexes of heterogeneous vinylidene chloride copolymer particles of the present invention are suitable for use in a variety of applications such as in carpet backsizing, as binders in paper coating compositions, as binders for asbestos, as adhesives for binding together various types of substrates as free films, as film-forming components for protective and/or decorative coatings (e.g., paints, etc.) and the like.

The use of such latexes in the foregoing applications is pursuant to the techniques conventional in the respective arts. Worthy of note, however, is the fact that the products or articles resulting from the foregoing uses of the latexes of the invention possess notably improved stability towards decomposition and/or discoloration (e.g., upon exposure to heat and light) relative to similar products employing conventional latexes of similar vinylidene chloride content while at the same time retaining the art recognized advantageous properties characteristic of conventional vinylidene chloride copolymer latexes.

The present invention is further illustrated by, though not intended to be limited by, the following examples. In such examples, all reference to "parts" is parts by weight unless otherwise indicated.

EXAMPLE NO. 1

Latex of Vinylidene Chloride/Butadiene/Itaconic Acid Copolymer Core Encapsulated with a Styrene/Butediene/Itaconic Acid Shell A two-stage latex is prepared having 68.6 parts of a monomer charge containing 40.6 parts of vinylidene chloride and 28 parts of butadiene polymerized in the first stage and 29.4 parts of a monomer charge containing 15.9 parts styrene and 13.5 parts butadiene polymerized in the second stage. Two parts of itaconic acid are added in conjunction with the initial aqueous medium of the first stage polymerization and, accordingly, a portion of it copolymerizes into the core portion formed in the first stage and the remainder polymerizes into the shell portion formed in the second stage.

The first stage is externally seeded with a 0.025 micrometer average diameter, 97:3 weight ratio styrene/acrylic copolymer latex in an amount corresponding to 0.7 part (dry basis) per 100 parts of total monomer.

An initial aqueous medium is employed which contains (per 100 parts of the total monomer) the aforementioned 2 parts of itaconic acid monomer, 62 parts of water, 0.1 part of sodium dodecyldiphenyl oxide disulfonate, 0.05 part of $NaHSO_3$, 0.01 part of chelating agent (i.e., the pentasodium salt of diethylenetriamine penta-acetic acid), 3 parts of carbon tetrachloride as a chain transfer agent and the aforementioned external seed.

An additional aqueous stream containing (by weight per 100 parts by weight of total monomer in both stages) a total of 37 parts deionized water, 0.5 part of sodium dodecyldiphenyl oxide sulfonate, 0.3 part of sodium hydroxide and 0.9 part of sodium persulfate is added to the aforementioned initial aqueous medium continuously during the course of both polymerizations.

The first polymerization stage is conducted under a nitrogen blanket at 85° C. and continuous monomer addition is employed at a constant rate over a 4.2 hour period. A one hour cookdown (at 85° C.) period is then employed to provide a first stage monomer to polymer conversion of about 90% (i.e., such that about 6 parts vinylidene chloride and about 1 part butadiene remain unpolymerized).

Following the first stage cookdown, the second stage monomer charge is continuously added at a constant rate over a 1.2 hour period and polymerization of such monomer charge and the residual first stage monomer is conducted at 90° C. under a nitrogen blanket.

Following complete addition of the second stage monomer charge, a one hour cookdown is provided. The resulting latex contains 46.1 weight percent polymer solids on a total weight basis and has a pH of 4.0. The average particle diameter of the dispersed polymer solids is about 0.14 micrometers and the residual monomer content is 1.13 weight percent vinylidene chloride and 0.86 weight percent styrene, both being on a total latex (i.e., including water) weight basis.

The resulting latex is then admixed with 1.5 parts of an antioxidant per 100 parts of polymer solids and a film of the resulting antioxidant-latex mixture is formed and is subjected to heat stability testing at 270° F. for 24 hours and to light stability testing for 24 hours in a fadeometer. [The antioxidant employed is a blend of ditridecyl thiopropionate (Cyanox ® 711 from American Cyanamide Co.) and butylated reaction product of p-cresol and dicyclopentadiene (Wing Stay ® from the Goodyear Tire and Rubber Co.) in the ratio of 8 to 1.] In a similar fashion, the following latexes are mixed with such antioxidant and films formed therefrom are subjected to heat and light stability testing for comparison: COMPARATIVE LATEX I: A 58/40/2 weight ratio vinylidene chloride/butadiene/itaconic acid single stage copolymer latex; COMPARATIVE LATEX II: A 53/45/2 weight ratio styrene/butadiene/itaconic acid copolymer latex; and COMPARATIVE LATEX III: A 70/30 weight ratio blend of Latexes II and I, respectively.

The test results are summarized below:

| Latex | Antioxidant Level[1] | Heat Stability[2] | Light Stability[3] |
|---|---|---|---|
| Example 1 | 1.5 | Color and Flexibility: OK | Color and Flexibility: OK |
| Comparative Latex I* | 2.3 | Dark Yellow and Brittle | Dark Yellow and Brittle |
| Comparative Latex II* | 1.5 | Color and Flexibility: OK | Color and Flexibility: OK |
| Comparative Latex III* | 1.5 | Dark Yellow and Brittle | Dark Yellow and Brittle |

*Not examples of the invention.
[1] In parts by weight per 100 parts by weight by polymer solids.
[2] Exposure to 270° F. for 24 hours.
[3] Exposure to ultraviolet light for 24 hours in a fadeometer.

As is apparent from the foregoing, the latex of the invention (i.e., Example No. 1) has heat and light stability which is substantially better than that of the comparative vinylidene chloride containing latexes (i.e., Comparative Latexes I and III above). It is also noted that the Comparative Latex II has good heat and light stability. However, it is not a vinylidene chloride-containing copolymer latex and therefore does not possess the art-recognized beneficial properties characteristic thereof.

EXAMPLE NOS. 2 to 4

Latexes of Vinylidene Chloride/Butadiene/Itaconic Acid Copolymer Particles Encapsulated by Polymerization of Ethyl Acrylate Thereon A series of two-stage latexes is prepared, each having (1) a 58/40/2 weight ratio vinylidene chloride/butadiene/itaconic acid copolymer core portion and (2) an ethyl acrylate homopolymer shell portion in various proportions by weight relative to each other (i.e., 90 parts core:10 parts shell; 80 parts core:20 parts shell; and 70 parts core:30 parts shell). The polymerization of such two-stage latexes is pursuant to the procedure of Example 1 except that, following the first polymerization stage, the residual unpolymerized first stage monomers are removed by steam stripping to ensure that the shell polymer portion resulting from the second stage polymerization is substantially free of vinylidene chloride.

For comparison, two single stage latexes and certain latex blends of such single stage latexes are also prepared. One of such comparative single stage latexes (i.e., C-IV) corresponds in composition to the aforementioned core portion copolymer and the other (i.e., C-V) corresponds in composition to the aforementioned ethyl acrylate homopolymer shell portion.

The solids content of each of the foregoing latexes employed herein is in the range of 40 to 50 weight percent polymer solids on a total weight basis.

Fourdrinier board samples, each coated either with a layer of one of the two-stage latexes or with a layer of one of the single stage or one of the blend latexes, are prepared for heat stability testing and for light stability testing. Such samples are prepared by applying an unpigmented layer of the chosen latex to a Fourdrinier board substrate using a No. 22 Meyer Rod and then drying the coated sample at 100° C. for one minute.

Following preparation of the foregoing samples, the initial brightness of each sample is measured using a Gardner Multipurpose Reflectometer and the samples are then placed in a fadeometer for exposure to light. After 20 hours of exposure in the fadeometer, the samples are removed therefrom and the brightness of each is again measured using the Gardner Multipurpose Reflectometer. The brightness results for each sample both initially and after exposure in the fadeometer are summarized below. In such results, the higher brightness numbers reflect desirable results in that relatively higher brightness readings reflect relatively lesser degrees of undesired discoloration.

| Example No. | Latex Type | Latex Composition | Initial | Brightness After 20 Hours of Fade-ometer Exposure |
|---|---|---|---|---|
| 2 | 2-stage | 90 parts core[1] 10 parts shell[2] | 81.2 | 49.6 |
| 3 | 2-stage | 80 parts core[1] 20 parts shell[2] | 80.4 | 54.0 |
| 4 | 2-stage | 70 parts cor[1] 30 parts shell[2] | 80.4 | 64.2 |

-continued

| Example No. | Latex Type | Latex Composition | Initial | Brightness After 20 Hours of Fade-ometer Exposure |
|---|---|---|---|---|
| C-IV* | Single-stage | 58/40/2 weight ratio vinylidene chloride/butadiene/itaconic acid | 80.5 | 47.0 |
| C-V* | Single-stage | Ethyl acrylate homopolymer | 80.6 | 73.4 |
| C-VI* | Blend | 80/20 weight ratio C-IV/C-V blend | 81.4 | 47.7 |
| C-VII* | Blend | 70/30 weight ratio C-IV/C-V blend | 81.2 | 51.7 |
| C-VIII* | None, uncoated control substrate | | 81.7 | 77.2 |

*Not an example of the invention.
[1]Core copolymer composition is 58/40/2 weight ratio vinylidene chloride/butadiene/itaconic acid.
[2]Shell portion is ethyl acrylate homopolymer.

As is apparent from the foregoing light stability results, the two-stage latexes of the invention undergo less discoloration upon exposure to light (i.e., are less light sensitive) than both the single-stage vinylidene chloride copolymer of C-IV and the latex blends of C-VI and C-VII. (Compare Examples 2, 3 and 4 with C-IV and with C-VI and C-VII and especially compare Example 3 with C-IV and Example 4 with C-VII). It is also apparent that the Comparative Latex C-V exhibits excellent light stability. However, since it does not contain vinylidene chloride, that polymer naturally lacks art-recognized beneficial properties characteristic of vinylidene chloride copolymers.

In a similar fashion, coated samples prepared in the aforementioned manner were tested for heat stability by observing the change in brightness thereof upon 4 hour exposure and 24 hour exposure to 150° C. The results of such testing is summarized below.

| Example[1] No. | Initial | Brightness 4 Hours at 150° C. | 24 Hours at 150° C. |
|---|---|---|---|
| 2 | 83.0 | 76.6 | 56.5 |
| 3 | 82.5 | 76.3 | 67.8 |
| 4 | 82.5 | 77.2 | 72.0 |
| C-IV* | 82.0 | 76.0 | 55.8 |
| C-V* | 81.7 | 78.2 | 74.2 |
| C-VI* | 81.7 | 76.8 | 38.4 |
| C-VII* | 81.7 | 77.4 | 34.2 |
| C-VIII* | 81.7 | 80.4 | 78.5 |

*Not an example of the invention.
[1]See the preceding light stability results for identification of the latexes employed.

As is apparent from the foregoing heat stability results, the two-stage latexes of the invention undergo less discoloration upon 24 hours of exposure at 150° C. than both the single-stage vinylidene chloride copolymer of C-IV and the latex blends of C-VI and C-VII. (Compare the 24 hour data for Examples 2, 3 and 4 with that for C-IV and with that for C-VI and C-VII and especially compare the 24 hour data for Examples 3 and 4 with that for C-VI and C-VII, respectively.) The excellent heat stability of Comparative Latex C-V is also apparent. However, it is again noted that, inasmuch as such latex is not a vinylidene chloride-containing copolymer latex, it naturally does not possess the art-recognized beneficial properties characteristic thereof.

While the present invention has been described with reference to specific illustrative examples, such examples are not to be understood as limiting the scope of the instantly claimed invention.

What is claimed is:

1. An aqueous latex comprising heterogeneous polymer particles which on the average (A) comprise, from about 35 to about 75 weight percent of polymerized vinylidene chloride based upon the total particle weight and (B) are composed of:
   (1) from about 50 to about 95 parts by weight per 100 parts by weight of the polymer particle of a core of a soft interpolymer comprising, in polymerized form and based upon the weight of such core,
      (a) from about 40 to about 80 weight percent of vinylidene chloride;
      (b) from about 20 to about 60 weight percent of an aliphatic conjugated diene; and
      (c) from 0 to about 10 weight percent of a monoethylenically unsaturated carboxylic acid; and
   (2) from about 5 to about 50 parts by weight per 100 parts of the polymer particle of an encompassing polymeric shell consisting essentially of, in polymerized form and based upon the weight of such shell,
      (a) from about 60 to 100 weight percent of a monomer selected from the group consisting of aliphatic conjugated dienes, monovinylidene aromatic monomers and saturated aliphatic esters of monoethylenically unsaturated carboxylic acids;
      (b) from 0 to about 30 weight percent of vinylidene chloride; and
      (c) from 0 to about 10 weight percent of a monoethylenically unsaturated carboxylic acid.

2. The aqueous latex of claim 1 wherein (1) the soft vinylidene chloride interpolymer core constituted from about 50 to about 90 parts by weight per 100 parts by weight of the polymer particle and (2) the polymeric shell constitutes from about 10 to about 50 parts by weight per 100 parts of the polymer particle.

3. The aqueous latex of claim 1 wherein the soft interpolymer core comprises in polymerized form, and based on the weight of such core, from about 40 to about 70 weight percent of vinylidene chloride, from about 30 to about 60 weight percent of an aliphatic conjugated diene and from 0 to about 10 weight percent of a monoethylenically unsaturated carboxylic acid.

4. The aqueous latex of claim 1 wherein (1) the core interpolymer comprises from about 1 to about 10 weight percent, based upon the weight of such core, of a monoethylenically unsaturated carboxylic acid.

5. The aqueous latex of claim 1 wherein the polymeric shell contains from about 1 to about 10 weight percent, based upon the weight of such shell, of a polymerized monoethylenically unsaturated carboxylic acid.

6. The aqueous latex of claim 5 wherein the polymeric shell contains at least about 20 weight percent of a polymerized aliphatic conjugated diene.

7. The aqueous latex of claim 6 wherein the polymeric shell contains at least about 20 weight percent of a polymerized monovinylidene aromatic monomer.

8. The aqueous latex of claim 5 wherein the polymeric shell contains at least about 20 weight percent of a polymerized monovinylidene aromatic monomer or a polymerized saturated aliphatic ester of a monoethylenically unsaturated carboxylic acid.

9. The aqueous latex of claim 8 wherein the polymeric shell contains at least about 20 weight percent of a polymerized aliphatic conjugated diene.

10. The aqueous latex of claim 1 wherein the polymeric shell consists essentially of (a) from about 30 to about 68 weight percent of polymerized styrene, (b) from about 30 to about 68 weight percent of polymerized 1,3-butadiene, (c) from about 2 to about 5 weight percent of polymerized acrylic acid, methacrylic acid, itaconic acid, fumaric acid or maleic acid, and (d) from about 0 to about 30 weight percent of polymerized vinylidene chloride.

* * * * *